May 6, 1924.

L. C. COLE

GEAR GENERATING MACHINE

Filed Dec. 12, 1921

Inventor
Lyndon C. Cole,
By Joseph M. Schofield
Attorney

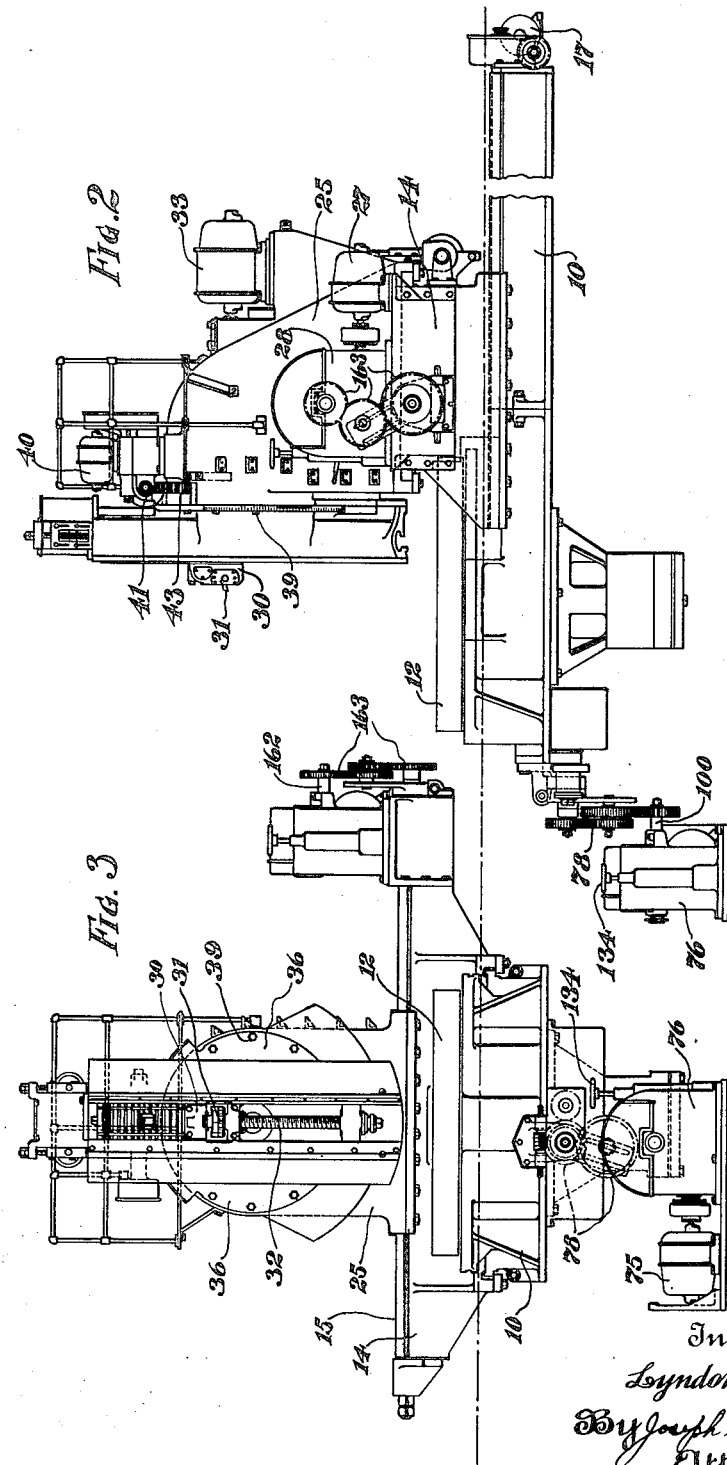

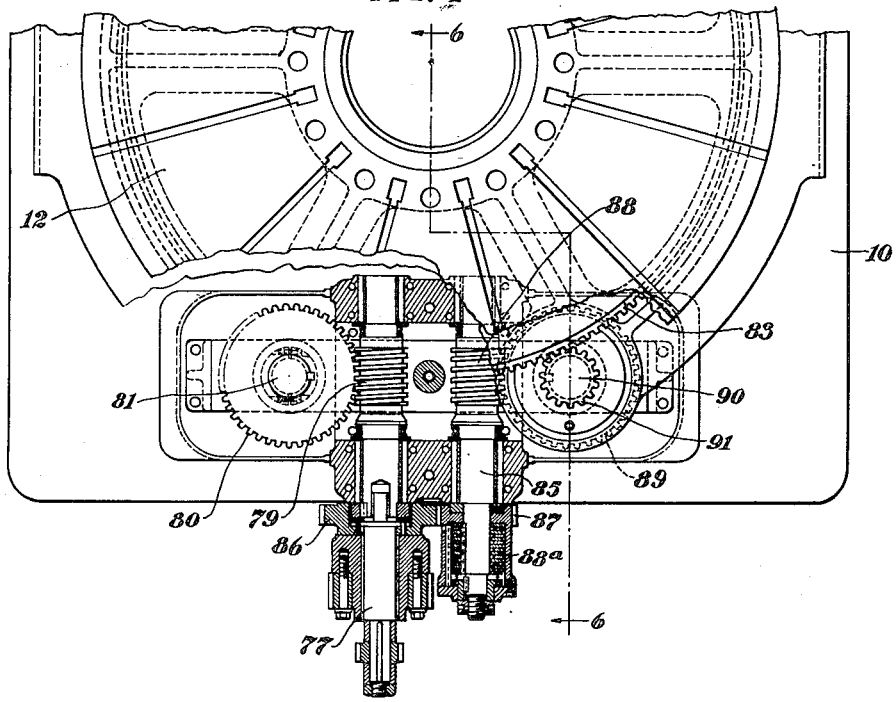
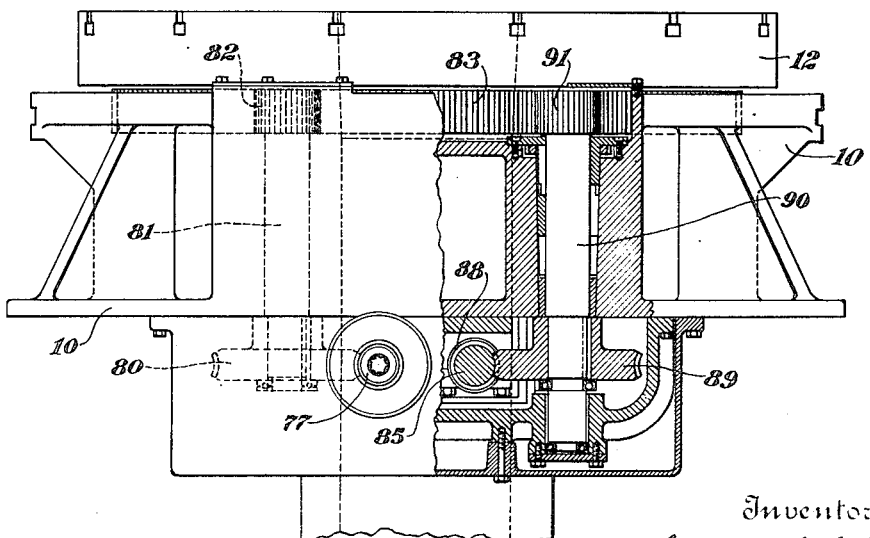

May 6, 1924.

L. C. COLE 1,492,627

GEAR GENERATING MACHINE

Filed Dec. 12, 1921　　8 Sheets-Sheet 4

Inventor
Lyndon C. Cole,
By Joseph N. Schofield
Attorney

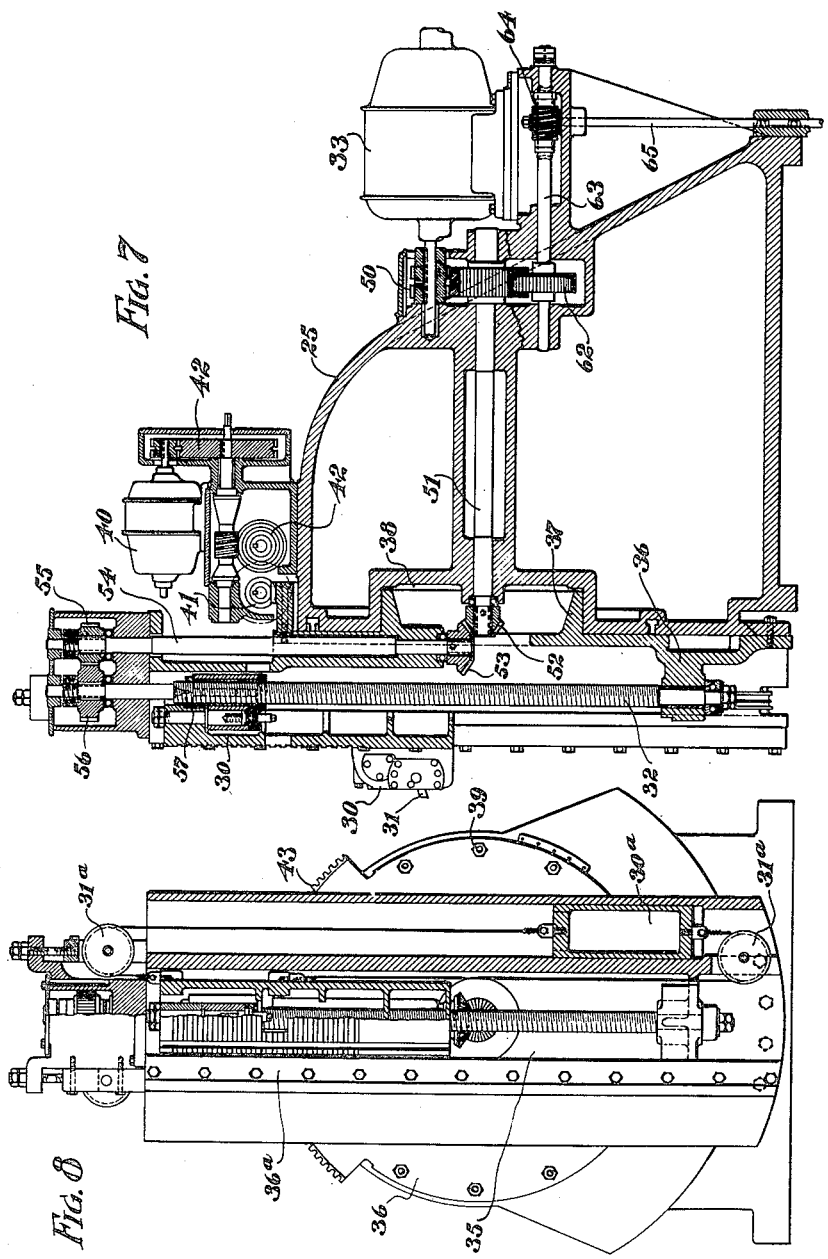

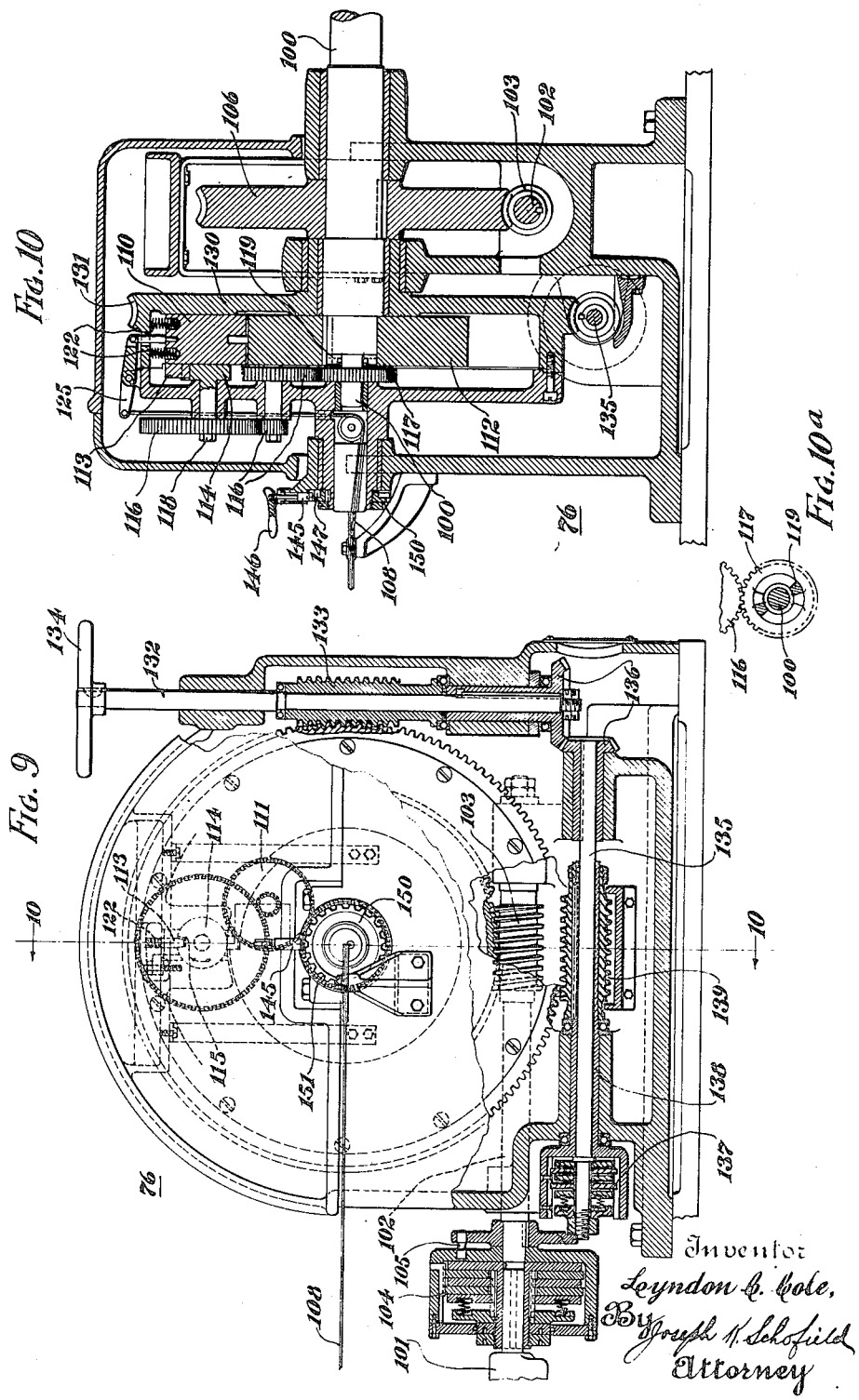

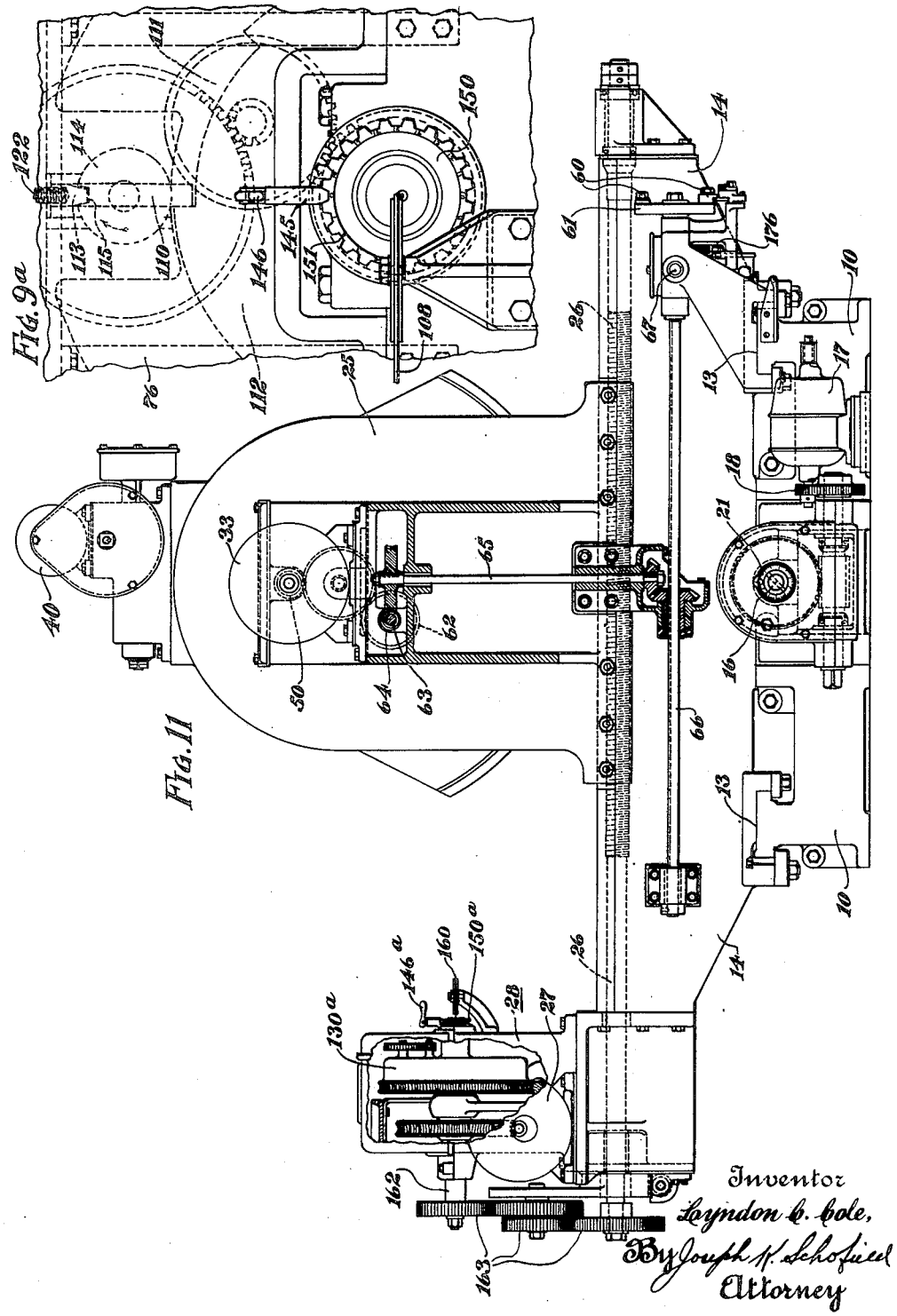

Patented May 6, 1924.

1,492,627

UNITED STATES PATENT OFFICE.

LYNDON C. COLE, OF HAMILTON, OHIO, ASSIGNOR TO NILES-BEMENT-POND COMPANY, OF NEW YORK, N. Y., A CORPORATION OF NEW JERSEY.

GEAR-GENERATING MACHINE.

Application filed December 12, 1921. Serial No. 521,839.

*To all whom it may concern:*

Be it known that I, LYNDON C. COLE, a citizen of the United States, residing at Hamilton, in the county of Butler and State of Ohio, have invented certain new and useful Improvements in Gear-Generating Machines, of which the following is a specification.

This invention relates to a gear generating machine adapted to use a rack form of cutter.

An object of the present invention is to provide an improved gear generating machine adapted for a wide range of sizes in which the tooth curves on the gear being formed may be generated by operation of a cutter comprising a plurality of teeth of rack form.

One feature which enables me to accomplish the above object is that the gear to be generated is mounted on and rotated by a table supported near one end of the base or bed of the machine, and the cutter, which as above stated is of rack form, is mounted in a head which may move laterally on a cross rail or saddle movable longitudinally along the base. By positioning the cross rail or saddle at different distances from the center of the table, gears of different diameters within a wide range may be generated.

Another object of the invention is to provide improved driving and positioning means for the cutter and also for rotating the table with the gear mounted thereon so that the table and gear may be expeditiously indexed between successive movements of the cutter.

Another object which is advantageous is that the support or housing for the cutter is movable along the cross rail or saddle mounted on the base predetermined precise distances and the table is adapted to be rotated a corresponding slight distance so that the gear and cutter may be moved relatively to each other in a manner to simulate the intermeshing action and movement of the gear and rack. These means for rotating the table and transversely moving the cutter support or head preferably comprise substantially similar mechanisms and are used for rotating the table through an angle subtended by a portion only of the circular pitch of the gear being generated, and for moving the rack cutter together with the cutter support laterally a predetermined distance equal to the same portion of the circular pitch to generate the tooth form. These means are preferably manually controlled independently of each other but are operated by power means.

Another object of the invention is to utilize the above described table rotating mechanism to rotate the table and gear angularly through the distance subtended by one tooth after each cutting stroke of the cutter during which operation the cutter operating mechanism is stopped.

Another object which is advantageous is that the motors operating the cutter reciprocating and table indexing mechanisms are adapted to be alternately started and stopped and their circuits are so arranged that both motors cannot operate simultaneously. Preferably these mechanisms are controlled by means of the electrical circuits disclosed in the application of Harold L. Blood, Serial No. 422,592 filed November 8, 1920.

Another object of the invention that is advantageous is that the mechanisms are started and stopped by the movement of a cable extending along the base, one end of which is attached to an operative part of the table indexing mechanism, and another part of the cable is engaged by a member operated by the cutter operating motor to pull the cable in a direction to release the table indexing mechanism and start its motor in operation.

Another object of the invention is to provide means for preventing lost motion between the table and its operating mechanism so that it may be positioned accurately for each cutting stroke of the cutter ram.

With these and other objects in view, my invention consists in the features of construction and operation set forth in the following specification and illustrated in the accompanying drawings.

In the accompanying drawings annexed hereto and forming a part of this specification, I have shown my invention embodied in a spur and helical gear generating machine of large size, but it will be understood that the invention can be otherwise embodied and that the drawings are not to be construed as defining or limiting the scope of the invention, the claims appended to this specification being relied upon for that purpose.

In the drawings:

Fig. 2 is a side elevation of the machine with the cutter supporting means shown in its extreme forward position.

Fig. 3 is a front elevation of the machine.

Fig. 4 is a plan view partly in section of a portion of the table rotating means.

Fig. 5 is an elevation partly in section of the table rotating means.

Fig. 7 is a vertical section taken longitudinally through the cutter support showing the cutter and its reciprocating mechanism.

Fig. 8 is a front elevation partly in section of the cutter reciprocating mechanism.

Fig. 9 is a detail view partly in section of the indexing mechanism for the table.

Fig. 9ª is a fragmentary view on an enlarged scale of a part of the mechanism shown in Fig. 9.

Fig. 10 is a vertical section of the indexing means taken on line 10—10 of Fig. 9.

Fig. 10ª is a fragmentary view of a part of the mechanism shown in Fig. 10.

Fig. 11 is a rear elevation partly in section of the complete machine showing mechanism for controlling the cutter operating mechanism.

Figure 12:
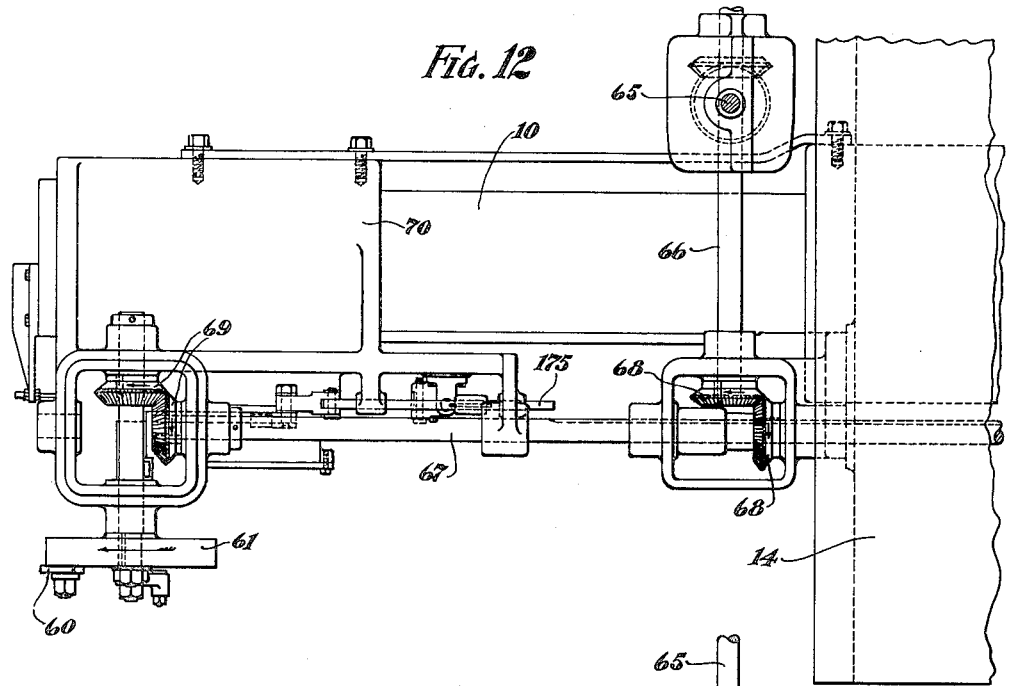

Fig. 12 is a plan view of a part of the cable control mechanism.

Figure 13:
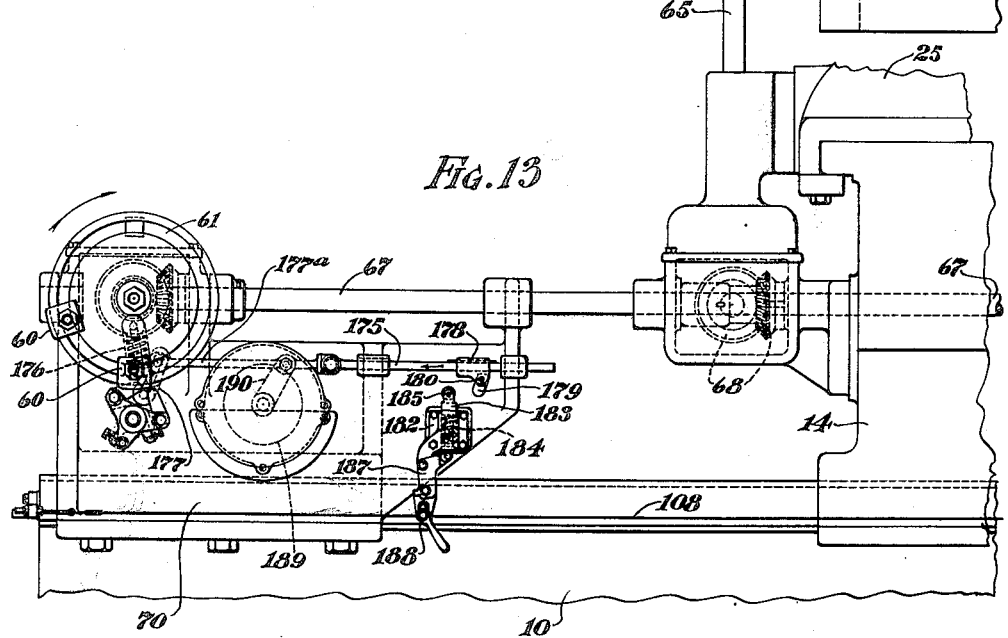

Fig. 13 is an elevation of the same.

Figure 14:
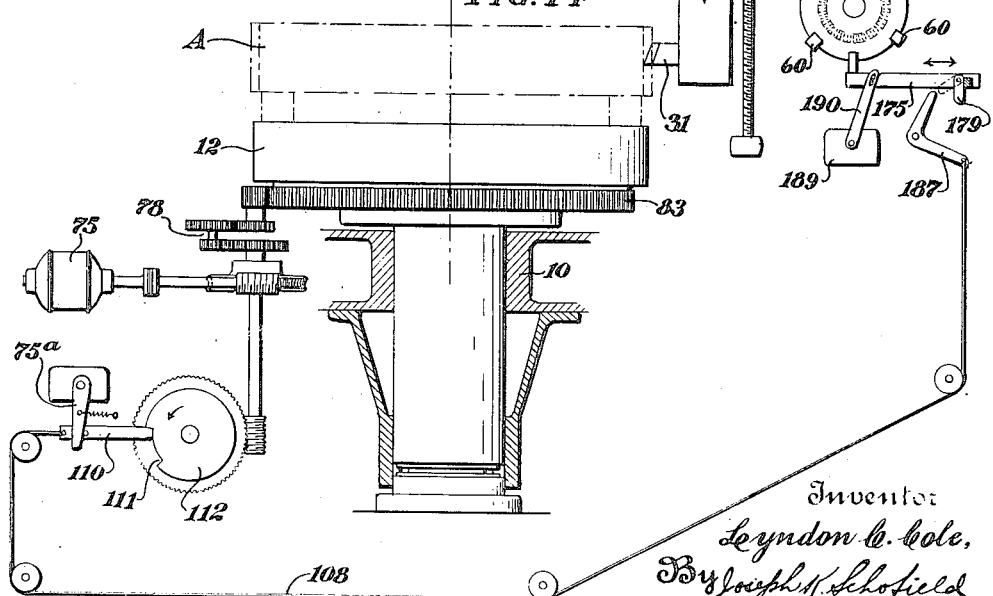

Fig. 14 is a diagrammatical view of the operative parts of the complete machine.

In the above mentioned drawings, I have shown but one modification of the invention which is now deemed preferable but it is to be understood that changes and modifications may be made within the scope of the claims without departing from the spirit of the invention.

Briefly, my invention in its broadest aspect, comprises the following principal parts; first, a bed having ways along its upper surface and a vertical bearing for a rotatable table near one end; second, a table rotatable within the vertical bearing in the bed and adapted to mount a gear; third, a cross rail or saddle movable toward and from said table along the longitudinal ways on the bed; fourth, a cutter head or housing mounted on said cross rail and adapted to move thereon transversely to the movement of the saddle on the bed; fifth, means to rotate the table step by step one tooth at a time between movements of the cutter; sixth, indexing mechanism for the table to rotate it through an angle corresponding to a portion of the circular pitch of the gear; seventh, mechanism for laterally moving said cutter support a predetermined small distance; eighth, reciprocating means for the cutter; and ninth, mechanism to alternately operate the cutter and table rotating mechanism.

Figure 6:
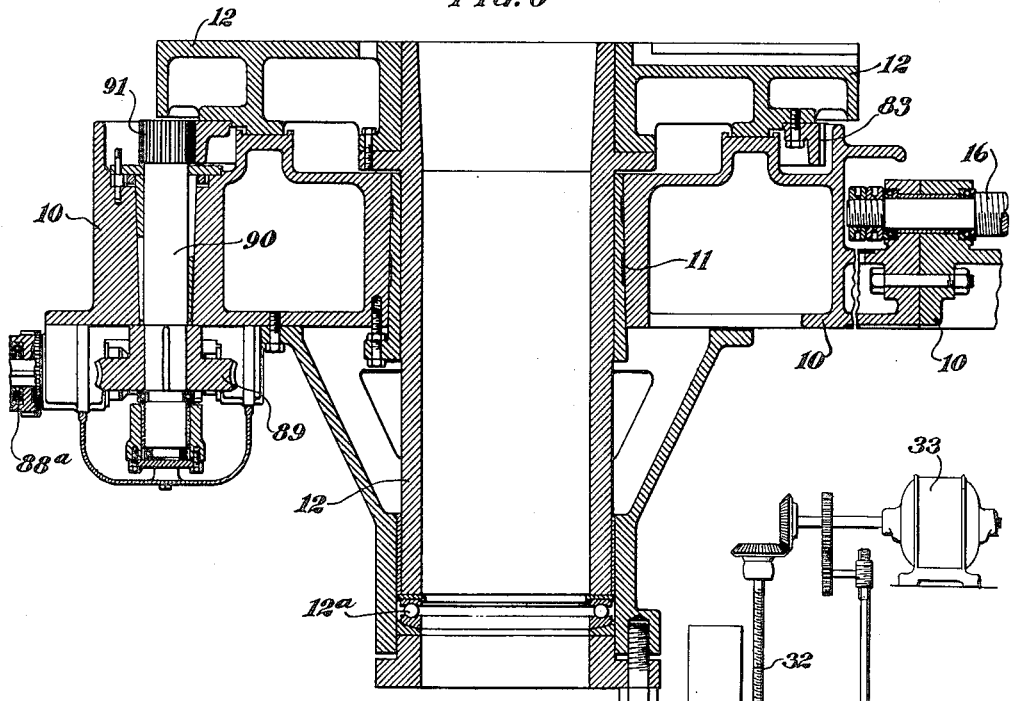
Fig. 6 is a vertical section taken on the line 6—6 of Fig. 4.

Referring more in detail to the figures of the drawing, at 10 is shown the bed or base of a machine having a vertical opening 11 near one end in which is adapted to be rotated the work-carrying table 12. Preferably a thrust bearing 12ª is provided adapted to carry the weight of the table 12. This, as shown in Fig. 6, may be located at the lower end of bearing 11. The depending portion of the table 12 is adapted to rotatably engage the walls of the opening 11. Extending along the upper surface of the base 10 are ways 13, one being provided on either side. Along the ways 13 a saddle 14 is adapted to be moved. This saddle 14 has ways 15 on its upper surface disposed at right angles to the ways 13 on the bed. To adjust the position of the saddle 14 toward or from the table 12 along the ways 13 of the bed 10, a screw 16 is provided extending lengthwise of the bed 10 from the table 12 to the rear which may be rotated by a small motor 17 through suitable gearing 18. Rotation of the motor 17 and therefore the screw 16 permits accurate adjustments of the position of the saddle 14 along the bed 10, the position of the saddle 14 being indicated by a suitable scale 20 placed along one side of the base. This scale 20 is preferably graduated into lengths of one inch, fractional parts of the inch through which the saddle 14 is moved being indicated by a graduated dial 21 (see Fig. 11) fastened to the extreme outer end of the screw 16.

Mounted on the saddle 14 so that it may be adjusted along the ways 15 is a cutter head or housing 25. The position of this cutter head 25 laterally of the bed 10 and along the ways 15 of the saddle 14 may be adjusted by rotation of a screw 26. Rotation of this screw 26 is accomplished by the motor 27. The mechanism shown generally at 28 between the motor 27 and screw 26 is adapted for moving the head 25 laterally predetermined small distances and stopping it accurately in any desired position. This mechanism will be later described in detail.

The mechanism for operating the cutter and cutter ram will now be described. On the forward surface of the head 25 is mounted the cutter ram 30 to which may be clamped the cutter 31 which as shown, comprises a plurality of straight sided cutters corresponding to adjacent teeth of a rack. This ram 30 and the cutter 31 are adapted to be moved up and down in a vertical plane by means of the screw 32, rotation of this screw being accomplished by the motor 33 mounted on the head 25. As usual with this type of cutter, it may be withdrawn from operative position on the return stroke of the ram. Preferably, also, the cutter ram 30 is counterweighted. This may be conveniently accomplished by weights 30ª on either side of the ram 30 contained in openings in the head 25 parallel to the slideway 35 and connected with the slide 30 by means of cables passing over wheels or pulleys 31ª at the upper and lower ends of the oscillating cutter ram support.

As shown in Figs. 7 and 8, the cutter ram 30 moves within a guideway 35 formed centrally of a member 36, the ram 30 being retained by strips 36ª clamped on each side of the guideway. This member 36 as shown in Fig. 7 is rotatably held adjacent the cutter head 25 by means of the projection 37 formed integrally on the member 36 which is fitted within a circular depression 38 provided in the forward face of the cutter head 25. Clamping bolts 39 permit fastening of the member 36 in any adjusted angular position. To angularly adjust the member 36 together with the cutter ram 30 and attached parts, a small motor 40 is used. This drives a worm 41 through suitable reducing gearing 42. Worm 40 is in mesh with a segmental worm wheel 43 preferably formed integral with the plate 36. Thus, by means of the motor 40, the cutter ram 30 may be positioned at any oblique angle with the ram movable in a vertical plane so that helical gears of any desired helix angle may be formed.

To drive the cutter ram 30 along the guideway 35 during the cutting operation, the motor 33 previously mentioned is utilized. This, through suitable reducing gear 50, drives a horizontal shaft 51 located centrally of the circular depression 38 in the housing 25 so that angular adjustments of the plate 36 to the right or left will not affect its driving connection. At the forward end of shaft 51 is a bevel gear 52 in mesh with a corresponding bevel gear 53 on a shaft 54 mounted in the plate 36. Through a gear 55 on the upper end of shaft 54, gear 56 on the upper end of screw 32 is driven. Rotation therefore of the motor 33 rotates the screw 32 which, through a nut 57 on the ram 30, drives the cutter 31. To reverse the direction of motion of the ram 30 and cutter 31 the direction of rotation of motor 33 is reversed. This, preferably, is accomplished by means of the electrical circuits described in the above mentioned application of H. L. Blood. The points in the stroke of the ram 30 at which the motor 33 and ram 30 are reversed are controlled by the position of dogs 60 on a dial 61 rotated by the motor 33 through driving connections and gearing shown in Figs. 1, 7, 13 and 14. These means comprise a gear 62 in mesh with one of the cutter driving gears 50 which drives a shaft 63 and worm 64. Worm 64 drives a vertical shaft 65 which in turn drives a horizontal shaft 66 extending along the saddle 14. Shaft 66 drives shaft 67 through a pair of bevel gears 68, and shaft 67 drives the dial 61 through bevel gears 69. Preferably, the dial 61 and shaft 67 are mounted on a bracket member 70, the position of which may be varied along bed 10 in accordance with the various adjusted positions of the saddle 14. Also, the motor 33 reverses its direction of rotation as soon as it reaches the lowest point for which it is set and, as soon as it reaches its uppermost positions, its reversal of rotation is delayed until the indexing movement of the table 12 and gear has been completed. The means controlling these mechanisms will be described generally as the specification proceeds.

Referring now to the mechanism for rotating the table 12 with a gear such as shown at A thereon, this comprises a motor 75 which, through mechanism 76, drives a set of change gears 78 and a driving shaft 77. It is obvious that unless some means is provided for preventing back lash or lost motion between the parts of the driving mechanism between the shaft 77, which forms the driving shaft for the table 12, and the table itself that the position of the table 12 during the cutting operation may be slightly inaccurate. For that reason, I provide two driving pinions, one of which is positively driven and the other frictionally driven at a slightly increased rate so that the table 12 is always crowded to one side and all back lash or lost motion is taken up on the same side. These driving means comprise the driving shaft 77 driven by motor 75 through the mechanism 76 presently to be fully described. Rotation of the shaft 77 by the change gears 78 rotates the worm 79 formed integrally thereon which is in mesh with a worm gear 80 at the lower end of a vertical shaft 81. The shaft 81 has a pinion 82 at its upper end which is in mesh with a gear 83 fastened to the table 12. It will thus be seen that rotation of the shaft 77 through the above described mechanism will rotate the table 12 in either direction depending upon the rotation of the shaft 77. In the present embodiment of the invention, shaft 77 is rotated always in the same direction. I also provide a shaft 85 parallel to and driven by the shaft 77, as by gears 86 and 87, which has a worm 88 thereon in mesh with a worm wheel 89. As shown in Fig. 4, the shaft 85 is driven from the shaft 77 at an increased speed by reason of the ratio between gears 86 and 87. The connection between the gear 87 and the shaft 85 is through the friction driving clutch 88ª. It will be seen therefore that the shaft 85 is frictionally driven at a speed higher than shaft 77 and therefore rotates the shaft 85 as far as permitted by the positively driven vertical shaft 81, the friction driving clutch 88a slipping to compensate for the increased ratio between shafts 77 and 85. Worm wheel 89 is on the lower end of a shaft 90 which corresponds to shaft 81. At the upper end of shaft 90 is a pinion 91 also in engagement with the table driving gear 83. By means of the mechanism above described, the table 12 may be rotated through small angles and accurately positioned by means of rotation of the shaft 77 without danger of its accuracy being effected by back lash or lost motion between elements of its driving connections.

Figure 1:
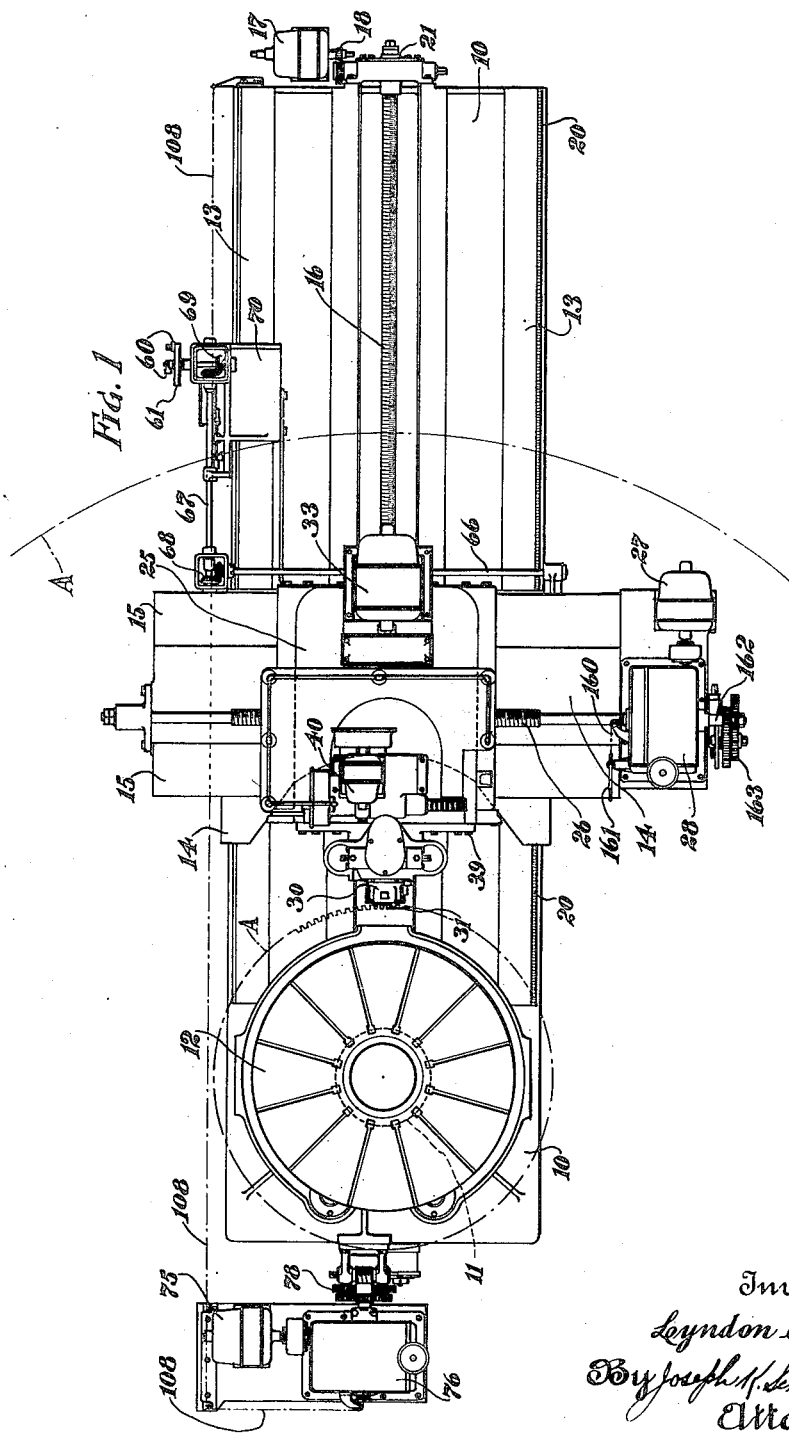
Figure 1 is a plan view of the complete machine.

Preferably, the change gears 78 (see Fig. 1) are so chosen that an integer number of revolutions of a shaft 100, which comprises the driving shaft for the change gears 78 and shaft 77, will rotate the table 12 through an angle subtended by one circular pitch. For varying numbers of and sizes of teeth on the gear being cut, therefore, a different arrangement of the gears 78 is necessary. These are, as shown in Figs. 1 and 2, arranged conveniently for the removal and substitution of different sizes of gears so that a proper gear ratio may be readily chosen.

The connections between the motor 75 and the shaft 100 by means of which the shaft 100 is always stopped in a predetermined position will now be described. These connections are contained within mechanism referred to generally by 76. Referring to Figs. 9 and 10, detail views of mechanism 76 are shown. Armature shaft 101 of motor 75 drives a shaft 102 on which is fastened a worm 103. Preferably, the motor shaft 101 drives worm shaft 102 through a friction driving clutch 104 so that sudden stoppage of the mechanism 76 for driving the table 12 will not injure the motor 75. Also a breaking link 105 is inserted between the friction driving clutch 104 and the shaft 102 so that, should the mechanism 76 be subjected to unduly large strains, this link 105 will break before straining or distorting any of the table positioning means which would have the effect of destroying the precision of the machine. In mesh with the worm 103 is a worm wheel 106 fast to the driving shaft 100 of change gears 78. The function of the mechanism shown generally at 76 is to provide means for rotating the driving shaft 100 through exactly integer revolutions, and also to provide the means for accomplishing the feeding or generative movements of the table. The starting of the motor 75 to advance the table through an angle corresponding to the circular pitch of the teeth being cut is controlled by the cable 108 and motor 75 is also stopped as soon as cable 108 is permitted to move in the opposite direction. This is shown diagrammatically in Fig. 14, the controller for the motor 75 being shown at 75a. Movement of the arm 75a to the left starts rotation of motor 75. Operation of the cable 108 to start motor 75 withdraws an index pawl 110 from engagement with an elongated arcuate slot 111 formed in the periphery of a disk 112 keyed to driving shaft 100. Upward movement of the pawl 110 therefore permits rotation of disk 112 and the shaft 100. Immediately after starting rotation of the shaft 100 and disk 112, the pawl 110 is held in its uppermost position by engagement of a projection 113 of the pawl 110 with the periphery of the small rotatably mounted disk 114. As seen in Fig. 9 this small disk 114 is provided with a slot 115 permitting the projection 113 to enter when this slot 115 and the elongated slot 111 in disk 112 are in alignment.

As above stated an integer number of revolutions of the shaft 100 and therefore of the disk 112 are required to rotate or index the table 12 through an angle corresponding to one circular pitch of the gear being formed. This number may be one, or more, as for instance, five or six. It is obvious that unless some provision is made for rotating the small disk 114 more slowly than the disk 112, as soon as the disk 112 makes one revolution, the pawl 110 will drop into the slots 115 and 111 thus preventing further rotation of shaft 100 and also stopping motor 75 by movement of the controller 75a to the right. In order to permit a plurality of revolutions of the disk 112 and shaft 100, I provide a special driving means from shaft 100 for the small disk 114. This comprises as shown in Figs. 9 and 10, a train of gears 116, one pair of which may be changed to vary the ratio between driving gear 117 in driving connection with the shaft 100 and the gear on the shaft 118 with which the disk 114 is integrally formed. For a purpose presently to be described, the driving connection between the gear 117 and the shaft 100 comprises a pair of clutch jaws 119, these being so formed that angular movement is permitted between the opposite jaw members (see Fig. 10a). By changing the ratio between members of the gear train 116 any number of revolutions of the disk 112 and shaft 100 may take place before the slot 115 in disk 114 rotates sufficiently to permit the pawl 110 to drop. This also must take place when the slot 111 in disk 110 is in alignment with slot 115.

Movement downward of the pawl 110 is accomplished by means of springs 122 positioned adjacent the pawl 110. This movement of pawl 110 downward serves to stop further rotation of shaft 100 by engagement of the pawl 110 with one edge of the arcuate slot 111. Simultaneously, by movement of the cable 108, one end of which is attached, as shown, to a lever 125 connected to the pawl 110, the motor 75 is stopped by movement of the controller lever 75$^a$ to its "off" position (see diagram Fig. 14). As the motor 75 will probably not be stopped at precisely the same instant that the pawl 110 drops, friction clutch 104 will slip and will yieldingly force the pawl 110 firmly against the wall of arcuate slot 111.

The above described part of mechanism 76 is used for rotating the table 12 sufficiently to re-position the gear mounted thereon for the next cutting stoke of the cutter ram 30. After the table 12 and gear have made one complete revolution with the cutter 31 set to cut to the full depth of the teeth, the table 12 and cutter head 25 must be so positioned relatively to each other that the flanks of the cutter 31 will cut upon different parts of the involute profile of the gear teeth. This in effect comprises the feeding and generative movements by means of which the cutter is fed relative to the gear and the tooth outlines of the gear are generated. This necessitates rotating the table through a fraction of a circular pitch and transversely moving the cutter head 25 a corresponding linear distance. The means for thus rotating the table 12 through this small angle is also contained in the mechanism shown generally at 76. This will now be described.

The pawl 110 which in its upward position permits rotation of shaft 100 and in its lower position stops further rotation of this shaft is mounted on a rotatable member 130, the periphery of which is provided with teeth forming a worm wheel 131. Rotation of this member 130 is accomplished by turning shaft 132 having at one end a worm 133 engaging the worm wheel 131 and a hand wheel 134 at its outer end. Preferably, a lost motion take-up is also provided comprising a shaft 135 driven from shaft 132 through bevel gears 136, their ratio being such that shaft 135 has a higher angular speed than shaft 132. On shaft 135 is a friction driving clutch 137 which drives a sleeve 138 surrounding shaft 135. On sleeve 138 is a worm 139 meshing with worm wheel 131. This mechanism serves to hold the rotatable member 130 rigidly in adjusted position without lost motion and also permits manual adjustment of the position of the pawl 110 angularly about the axis of shaft 100 by rotation of plate 130.

In order to generate the tooth form accurately so that its outline will be smooth from the root to the tip of the tooth, a number of cuts must be taken on each tooth with the cutter 31 in different positions relative to the tooth curves, so that the cutter 31 cuts a smooth involute curve. With the table 12 and gear rotated through a definite fraction of a circular pitch of the gear being formed, the cutter 31 must be laterally displaced a distance exactly corresponding thereto. The number of settings of the gear and cutter will vary dependent upon the size and character of the teeth. I, therefore, provide means to adjust the angular position of the table 12 and lateral position of cutter 31 in a plurality of exactly corresponding positions. To facilitate this and to aid in adjusting the gear and cutter 31 predetermined corresponding small distances to properly form the tooth curve outline, I mount a pawl 145 (see Figs. 9, 9$^a$ and 10) on the housing of mechanism 76 and provide a handle 146 by means of which it may be raised and lowered. An annular plate 147 is also provided rigidly fastened to the mechanism 76 just below the pawl 145 into which pawl 145 may fit in its lower position. Keyed to an extension of the rotatable member 130 is a plate 150 having notches 151 each corresponding in shape to the forward end of pawl 145. These notches 151 are equidistantly spaced about the periphery of the plate 150 and are also, for convenience, numbered as shown. With the pawl 145 withdrawn from the notches 148 and 151, the rotatable member 130 may be turned by means of handle 134 until any predetermined notch 151 in plate 150 is in alignment with the notch 148 in plate 147.

After the table 12 with its gear has been rotated through a complete revolution, the disk 130 may be angularly adjusted so that pawl 145 fits into another notch 151 adjacent to the notch 151 previously engaged by pawl 145. Then, when the disk 112 and shaft 100 have again been rotated by motor 75, they will have been rotated an integer number of revolutions plus a definite fraction depending on the new position of the disk 130.

The mechanism for transversely moving the cutter head 25 with the cutter 31 as above stated comprises the screw 26, motor 27 and the mechanism 28. Preferably, the mechanism 28 may be similar generally to the mechanism 76 previously described for rotating the table 12 except that the control cable is not connected as this mechanism is preferably manually controlled. The pawl within mechanism 28 corresponding to pawl 110 is controlled through a short cable 160 which may be normally controlled by hand lever 161 (see Fig. 1). The shaft 162 driven by motor 27 through the mechanism 28 is in driving connection with screw 26 through change gearing 163, the parts of which may readily be changed to vary the amount of rotation of screw 26 for each rotation of shaft 162. In setting up the machine change gears 163 are so chosen that an integer number of revolutions of shaft 162 moves the cutter head 25 a distance equivalent to one circular pitch of the gear being generated, this integer number being the same as the number of turns required of shaft 100 to rotate the table 12 through one circular pitch. A notched plate 150ª similar to plate 150 in mechanism 76 is also mounted on and forms a part of mechanism 28 so that the cutter head 25 may be moved distances corresponding to fractional parts of a circular pitch.

As above stated, the change gearing 163 is so chosen that the same integer number of revolutions are required of shaft 162 to move the cutter 21 transversely a distance equal to a circular pitch of the gear as are required of shaft 100 to rotate the table 12 through a corresponding arc. Then when the cutter 31 is to be moved transversely through a fractional part of a circular pitch, by setting the mechanism 28 so that its pawl engages the notch corresponding with that on plate 150, the cutter 31 may be moved through the same fractional part of a circular pitch. A small lever 146ª corresponding to lever 146 permits adjustment of the rotatable member 130ª so that a pawl corresponding to 145 may be positioned in notches of plate 150ª. So long as the adjustment is such that similarly numbered notches in plates 150 and 150ª are engaged, the position of table 12 and cutter 31 are correct to properly generate an involute tooth curve.

Actual movement of the disk 112 and shaft 100 of the table rotating mechanism 76 and the corresponding parts of the cutter adjusting means within mechanism 28 is not accomplished by rotation of member 130 and the corresponding member 130ª in mechanism 28. After these members 130 and 130ª have been adjusted to new angular positions, the next operation of motors 75 and 27 will rotate these parts and, on account of the new position taken up by the arcuate slot 111 in disk 112 and corresponding parts in mechanism 28, these disks will be stopped in a new position. Angular movement of members 130 and 130ª by means of the shaft 132 and shaft in mechanism 27 corresponding thereto is permitted while the pawls in mechanism 76 and 28 are in their lowermost position by reason of the fact that the arcuate slots 111 extend around a part of the circumference of the disks.

It is obvious that the rotative movement of table 12 and the transverse movement of cutter head 25 must correspond to the same fractional part of the circular pitch of the gear being generated. If, as above stated, shaft 162 makes the same integer number of turns to move the cutter head 26 a distance equal to the circular pitch as the shaft 100 makes to rotate the gear and table 12 through an angle subtended by one pitch, then equal fractional rotations of the shafts 100 and 162 move the table 12 and cutter head 25 equal fractional parts of the circular pitch. We can, therefore, by rotating the member 130 and its corresponding member 130ª in mechanism 27 through the same angle, the gear A and cutter 31 will be given proper generative movements. These movements of the cutter 31 and the gear being cut are utilized to effect their feeding movements. By adjusting the mechanisms 76 and 28 so that disk 130 and its corresponding member 130ª assume a plurality of corresponding different positions separated by small fractions of the distance between adjacent teeth on the gear being cut, the tooth curve formed will be smooth throughout its involute portion.

The cable 108 by means of which the motor 75 for rotating table 12 is controlled has previously been referred to. This is pulled in a direction to withdraw the pawl 110 and start motor 75 by the following mechanism: Slidably mounted on the bracket 70 is a rod 175 (see Figs. 12 and 13). This is reciprocated in either direction by means of the dogs 60 on controller disk 61 through oscillation of the arm 176, a part of which is in the path of the dogs 60. At each limit of movement of the cutter ram 30 in either direction, one of the dogs 60 strikes against the side of arm 176 thus oscillating the arm 177 attached to the sliding rod 175 by means of a connecting rod or link 177ª. On the rod 175 is a collar 178 having a pawl 179 depending therefrom. This pawl is pivoted to bracket 178 by pin 180, the pawl 179 being so formed that it may oscillate in one direction only namely to the left from the position shown in Fig. 13.

Mounted on the bracket 70 is a frame 182 having a vertically movable plunger 183 held normally in its uppermost position by spring 184. The upper end of plunger 183 which preferably is provided with a roller 185 is directly in the path of pawl 179 and it is therefore depressed by movement of the rod 175 to the left as seen in Fig. 13. Movement to the right of rod 175 does not depress the plunger 183 as the pawl 179 oscillates about pin 180. Downward movement of plunger 183 oscillates a bell crank 187, one arm of which abuts against the lower end of plunger 183, the other arm of bell crank 187 being fastened to the cable 108 by a clamping screw 188. Movement of the rod 175 to the left and oscillation of bell crank 187 therefore pulls the cable to the left thus withdrawing pawl 110 and permitting motor 75 to start. The return movement of cable is accomplished by the action of springs 122 and movement downward of the pawl 110 as previously stated.

From the construction disclosed in Fig. 7, it is obvious that when the cutter ram 30 with its cutter 31 reaches its lowermost point, the motor 33 must be reversed. This is accomplished by means of a pilot switch 189 shown diagrammatically in Figs. 13 and 14 which is oscillated by an arm 190, the outer end of which is attached to sliding rod 175. Rotation of the disk 61 through its driving connections in the direction shown by the arrow in Fig. 14 moves the rod 175 to the left which through arm 190 moves the pilot switch 189 to reverse motor 33 preparatory to the cutting stroke of the ram 30. Simultaneously, however, a switch not shown is opened thus preventing motor 33 from starting. This movement of rod 175 to the left pulls the cable 108 through the mechanism described and starts motor 75 to index the table 12. As soon as the table indexing movement is complete, downward movement of pawl 110 pulls the cable to the right starting motor 33 on its cutting stroke and simultaneously stopping motor 75.

Referring briefly to the operation of the above described machine, the gear to be cut is first mounted centrally of the table 12 and suitably clamped thereto. This, as shown, takes a position such as shown by one of the dotted circles A. The saddle 14 is then positioned on the base 10 so that the cutter 31 will just cut into the periphery of the gear. With the saddle fixed in position the cutter motor 33 is started and, by means of motor 75, the gear is rotated between each cutting stroke of the cutter 31 so that an adjacent tooth space of the gear will be cut on each stroke of the cutter ram 30. This movement of the table 12 will, of course, be accomplished automatically and the cutter 31 started and stopped by means of the control mechanism operated by dogs 60 above described. After the table 12 with its gear A has made a complete turn, saddle 14 is then advanced toward the gear A and another turn of the gear takes place during which cutter 31 cuts further into depth. After the cutter 31 has been advanced by means of saddle 14 until it cuts to full depth of the teeth and the gear A has again been rotated a complete revolution, the relative positions of the cutter 31 and gear A must be altered to feed the cutter 31 relative to the gear A so that it will cut on a different part of the tooth curve. This is accomplished by rotating the table 12 with its gear and transversely moving the cutter in a manner to simulate the relative movements of a gear and rack, this movement of the cutter 31 being tangent to a pitch circle of the gear being cut. Rotating the gear through a small angle therefore requires a corresponding movement of the cutter 31 which is in a position corresponding to a rack in mesh with the gear being cut. This is manually controlled by adjustment of mechanisms 76 and 28 so that when the cutter 31 is again operated, it cuts each tooth of the gear A in a slightly different portion of the involute tooth curve. A number of different settings or adjustments of the table 12 and cutter 31 may be used, each adjustment taking place after the table and gear have made a complete turn.

Should one of the teeth of cutter 31 become worn or damaged, the cutter 31 with its housing 25 may be readily moved laterally a distance equal to a full circular pitch of the gear being cut, thus another tooth of the rack form cutter would be placed in position to do the major portion of the cutting.

What I claim is:

1. A gear generating machine comprising in combination, a base, a table adapted to support a gear rotatably mounted on said base near one end, means to rotate said table, a transversely movable cutter support on said base, a cutter on said support, means to reciprocate said cutter, means to give said cutter and support generating lateral movements, and means to index said table and gear between reciprocations of said cutter, said table indexing means being used also to rotate said table and gear in accordance with generating lateral movements of said cutter support to accomplish feeding movements of the gear relative to the cutter.

2. A gear generating machine comprising in combination, a base, a table adapted to support a gear rotatably mounted on said base near one end, means to rotate said table, a transversely movable cutter support on said base, a cutter movable on said support, means to reciprocate said cutter, means to give said cutter predetermined small generating lateral movements, and means to index said table and gear between reciprocations of said cutter, said indexing means being used also to rotate said table and gear in accordance with said generating lateral movements of said cutter support to accomplish feeding movements of the gear relative to the cutter.

3. A gear generating machine comprising in combination, a base, a table adapted to support a gear rotatably mounted on said base near one end, means to rotate said table, a transversely movable cutter support on said base, a cutter movable on said support, means to move said support and cutter predetermined distances tangentially of said table, means to reciprocate said cutter, and means to index said table and gear angularly one tooth at a time between reciprocations of said cutter, said indexing means being used also to rotate said table and gear in accordance with generating lateral movements of said cutter support to accomplish feeding movements of the gear relative to the cutter.

4. A gear generating machine comprising in combination, a base, a table adapted to support a gear rotatably mounted on said base near one end, means to rotate said table, a transversely movable cutter support on said base, a cutter thereon, means to move said support and cutter predetermined distances tangentially of said table, means to reciprocate said cutter at different oblique angles in a vertical plane, and means to index said table and gear between reciprocations of the cutter, said indexing means being used also to rotate said table and gear in accordance with generating lateral movements of said cutter support to accomplish feeding movements of the gear relative to the cutter.

5. A gear generating machine comprising in combination, a base, a table adapted to support a gear rotatably mounted on said base near one end, means to rotate said table, a transversely movable cutter support on said base, a cutter thereon, means to reciprocate said cutter variable distances, and means to index said table and gear between reciprocations of the cutter, said indexing means being used also to rotate said table and gear a portion of a tooth space in accordance with generating lateral movements of said cutter support to accomplish feeding movements of the gear relative to the cutter.

6. A gear generating machine comprising in combination, a base, a table adapted to support a gear rotatably mounted on said base near one end, a saddle movable along said base, a support on said saddle movable transversely of said base, a cutter adapted to be reciprocated on said support, means to index said table between each movement of the cutter, and means to rotate said table and move said support laterally predetermined co-relative amounts to simulate the rotating and sliding action of a gear and rack.

7. A gear generating machine comprising in combination, a base, a table adapted to support a gear rotatably mounted on said base near one end, a saddle movable along said base, a support on said saddle movable transversely of said base, a cutter adapted to be reciprocated on said support, means to index said table and gear angularly one tooth at a time, and means to rotate said table and move said housing laterally predetermined co-relative amounts to simulate the rotating and sliding action of a gear and rack.

8. A gear generating machine comprising in combination, a base, a table adapted to support a gear rotatably mounted on said base near one end, a saddle movable along said base, a support on said saddle movable transversely of said base, a cutter adapted to be reciprocated at different oblique angles in a vertical plane on said support, means to index said table and gear angularly one tooth at a time between each complete movement of said cutter, and means to rotate said table and move said support laterally predetermined co-relative amounts to simulate the rotating and sliding action of a gear and rack.

9. A gear generating machine comprising in combination, a base, a table adapted to support a gear rotatably mounted on said base near one end, a saddle movable along said base, a support on said saddle movable transversely of said base, a cutter adapted to be reciprocated on said support, means to index said table between each movement of the cutter, and manually controlled means to rotate said table and move said support laterally predetermined co-relative amounts to simulate the rotating and sliding action of a gear and rack after said gear has completed a complete revolution.

10. A gear generating machine comprising in combination, a base, a table adapted to support a gear rotatably mounted on said base near one end, a saddle movable along said base, a support on said saddle movable transversely of said base, a cutter adapted to be reciprocated on said support, means to index said table between each movement of the cutter, and manually controlled means to rotate said table and move said support in a direction tangential to the pitch circle of said gear to simulate the rotating and sliding action of a gear and rack after said gear has completed each revolution.

11. A gear generating machine comprising in combination, a base, a table adapted to support a gear rotatably mounted on said base near one end, a cutter support on said base, a cutter slidably mounted thereon, and means to reciprocate said cutter, said means comprising a motor mounted on said support and driving connections including a screw, said motor being adapted to be reversed at variable points in the stroke of said cutter.

12. A gear generating machine comprising in combination, a base, a table adapted to support a gear rotatably mounted on said base near one end, a cutter support on said base, a cutter slidably mounted in a vertical plane thereon, and means to reciprocate said cutter, said means comprising a motor mounted on said support and driving connections including a screw, said motor being adapted to be reversed at variable points in the stroke of said cutter.

13. A gear generating machine comprising in combination, a base, a table adapted to support a gear rotatably mounted on said base near one end, a cutter support on said base, a cutter slidably mounted thereon, and means to reciprocate said cutter, said means comprising a motor mounted on said support and driving connections including a screw, said motor being adapted to be reversed at variable points in the stroke of said cutter and stopped when said cutter is in its uppermost position.

14. A gear generating machine comprising in combination, a base, a table adapted to support a gear rotatably mounted on said base near one end, a cutter support on said base, a cutter slidably mounted thereon, and means to reciprocate said cutter, said means comprising a motor mounted on said support and driving connections including a screw, said motor being adapted to be reversed at variable points in the stroke of said cutter and stopped in its uppermost position after each cutting stroke.

15. A gear generating machine comprising in combination, a base, a table adapted to support a gear rotatably mounted on said base near one end, a cutter support on said base, a cutter slidably mounted thereon, and means to reciprocate said cutter in angularly adjustable vertical planes, said means comprising a motor mounted on said support and driving connections including a screw, said motor being adapted to be reversed at variable points in the stroke of said cutter and stopped in its uppermost position after each cutting stroke.

16. A gear generating machine comprising in combination, a base, a table adapted to support a gear rotatably mounted on said base near one end, a cutter support on said base, a cutter thereon, means to reciprocate said cutter, said means comprising a motor mounted on said support and connected to a cutter driving member by a shaft extending in alignment with the axle of said tool supporting member and including a screw, and means to reverse said motor at variable points in the stroke of said cutter.

17. A gear generating machine comprising in combination, a base, a table adapted to support a gear rotatably mounted on said base near one end, a cutter support on said base, a cutter thereon, means to reciprocate said cutter, said means comprising a motor mounted on said support and connected to a cutter driving member by a shaft extending in alignment with the axis of said tool supporting member and including a screw, means to reverse said motor at variable points in the stroke of the tool slide, and means to stop said motor when said cutter reaches its uppermost position after each cutting stroke.

18. A gear generating machine comprising in combination, a base, a table rotatably mounted thereon near one end and adapted to mount a gear, means to index said table, a cutter support on said base, means to reciprocate a cutter past the face of said gear, said means to index said table and reciprocate said cutter comprising motors, and means controlling said motors whereby they are alternately operated.

19. A gear generating machine comprising in combination, a base, a table rotatably mounted thereon near one end and adapted to mount a gear, means to index said table, a cutter support on said base, means to reciprocate a cutter past the face of said gear, said means to index said table and reciprocate said cutter comprising motors, and means controlling said motors whereby when one of said motors is stopped the other motor is started in operation.

20. A gear generating machine comprising in combination, a base, a table rotatably mounted thereon near one end and adapted to mount a gear, means to index said table, a cutter support on said base, means to reciprocate a cutter past the face of said gear, said means to index said table and reciprocate said cutter comprising independent motors, and means controlling said motors whereby they are alternately operated.

21. A gear generating machine comprising in combination, a base, a table rotatably mounted thereon near one end and adapted to mount a gear, means to index said table, a cutter support on said base, means to reciprocate a cutter past the face of said gear, said means to index said table and reciprocate said cutter comprising independent motors, and means comprising a cable controlling said motors whereby they are alternately operated.

22. A gear generating machine comprising in combination, a base, a table rotatably mounted thereon near one end and adapted to mount a gear, means to index said table, a cutter support on said base, means to reciprocate a cutter past the face of said gear, said means to index said table and reciprocate said cutter comprising independent motors, and means comprising a cable controlling said motors whereby when one of said motors is stopped the other motor is started in operation, and when the second motor is stopped the first motor is again started.

23. A gear generating machine comprising in combination, a base, a table rotatably mounted thereon near one end and adapted to mount a gear, means to index said table, a cutter support on said base, means to reciprocate a cutter past the face of said gear, both of said means comprising motors, a cable extending along said base, means operated by said cutter reciprocating motor to pull said cable in one direction to stop said cutter reciprocating motor and start said table indexing motor, and means on said table indexing mechanism to pull said cable in the opposite direction to stop said table indexing motor when the indexing movement of said table has been completed and to start said cutter reciprocating motor.

24. A gear generating machine comprising in combination, a base, a table rotatably mounted thereon near one end and adapted to mount a gear, means to index said table, a cutter support on said base, means to reciprocate a cutter past the face of said gear, both of said means comprising motors, a cable extending along said base, means operated by said cutter reciprocating motor to pull said cable in one direction to stop said cutter reciprocating motor and start said table indexing motor, means on said table indexing mechanism to pull said cable in the opposite direction to stop said table indexing motor when the indexing movement of said table has been completed and to start said cutter reciprocating motor, and means to reverse the cutter reciprocating motor during its operation.

25. A gear generating machine comprising in combination, a base, a table rotatably mounted thereon near one end and adapted to mount a gear, means to index said table, a cutter support on said base, means to reciprocate a cutter past the face of said gear, both of said means comprising motors, a cable extending along said base, means operated by said cutter reciprocating motor to pull said cable in one direction to stop said cutter reciprocating motor and start said table indexing motor, and means on said table indexing mechanism to pull said cable in the opposite direction to stop said table indexing motor when the indexing movement of said table has been completed and to start said cutter reciprocating motor whereby said motors are alternately and continuously operated.

In testimony whereof, I hereto affix my signature.

LYNDON C. COLE.